Nov. 14, 1950 J. WEINGARTEN 2,530,275

CATHODE-RAY TUBE IMAGE CONTROL

Filed March 16, 1946 2 Sheets-Sheet 1

INVENTOR
JOSEPH WEINGARTEN
Joseph Weingarten

INVENTOR
JOSEPH WEINGARTEN

Joseph Weingarten

Patented Nov. 14, 1950 2,530,275

UNITED STATES PATENT OFFICE 2,530,275

CATHODE-RAY TUBE IMAGE CONTROL

Joseph Weingarten, Boston, Mass.

Application March 16, 1946, Serial No. 654,942

10 Claims. (Cl. 178—7.5)

(Granted under the act of March 3, 1883, as amended April 30, 1928; 370 O. G. 757)

This invention relates in general to photosensitive systems, and more specifically to novel photosensitive structure particularly usable in connection with cathode ray image presentation.

The broad principles of the present invention, as will be seen from the disclosure below, have application in numerous systems where an image is produced by an intensity modulated luminous point deflected in a predetermined pattern. Consider a representative example, namely the transmission and reception of pictures, as in television. At a television transmitter electrical picture signals (video) are generated from the scene to be transmitted by cathode ray or other suitable camera pick-up apparatus. These video signals cover a comparatively wide frequency band and fluctuate in accordance with the instantaneous lights and shades of points of the aforementioned scene. The video signals are combined with synchronizing and other pertinent information, and then transmitted by conventional radio techniques.

At the receiver, the signals are detected to provide a video signal, which except for the minor distortion experienced in transmission, is a replica of the video signal developed by the transmitter pick-up device. Image reproduction is generally accomplished by a cathode ray tube, which as is well known, includes within an envelope an electron gun for producing an electron beam focussed to a sharply defined point upon a fluorescent screen. Electrons impinging upon the screen cause a luminous spot to appear thereon, the luminous intensity of the spot being related to the density of the impinging electron beam.

Associated with the cathode ray tube is apparatus for synchronously deflecting the electron beam, so as to cause the luminous spot to scan the surface of the fluorescent screen. The received video signals are employed to modulate the instantaneous density of the electron beam, thereby providing an image, which may be viewed directly upon the fluorescent screen or by projection upon a larger viewing screen.

There are a large number of factors which influence the fidelity of reproduction of a television image. Among these are the well known considerations of allowable signal band width and scanning line frequency. However, these are not inherent limitations imposed by the equipment employed, as for example, are amplifier and cathode ray tube signal distortions. At the television receiver, the low-level video signal appearing at the detector output must be reproduced in the form of light having an intensity variation which exactly corresponds to the received video signal fluctuation. To accomplish this, it is evident that the circuits between the receiver detector and the intensity control element of the cathode ray tube must be substantially distortionless.

Video amplifiers have been in use which through careful design provide linear amplification and phase shift characteristics over the wide frequency band required. The overall response of video amplifiers may be further improved by utilizing conventional negative or inverse feedback wherein a fraction of the output of the amplifier circuits is effectively coupled back to the input thereof, the phase of the feedback signal being opposite to the normal input signal phase. Feedback effects may through filter circuits be accentuated in a specific frequency range so that the required uniform amplification characteristic is obtained.

It has been observed, however, that the application of a properly amplified video signal to a reproduction device, as a cathode ray tube, does not produce an image having an instantaneous luminous intensity variation directly proportional to the video signal magnitude. Thus, in a conventional cathode ray tube, the spot intensity is a non-linear function of the applied signal due to factors such as threshold level and non-uniformity of the fluorescent screen material. The actual relation between signal intensity applied to the cathode ray tube and spot intensity is highly irregular and indeterminate and varies considerably from tube to tube of the same general type. As a result, the cathode ray tube, in converting an electrical to a light signal, limits the fidelity of image reproduction in a manner which precludes correction by the introduction of fixed compensation in the associated circuits.

The present invention contemplates and has a primary object the reduction of distortion encountered in image reproducing systems. Broadly, this is achieved by providing photosensitive apparatus for generating an electrical signal from the luminous image being produced. This signal, which in general differs from the image producing video signal is utilized to compensate the video signal circuits to improve the overall fidelity of reproduction.

Another object of the present invention is to provide a novel cathode ray image reproducing tube with simplified photosensitive means for continuously generating an electrical signal from the reproduced image. Thus, in the cathode ray tube structure of this invention a video signal is applied to modulate the electron beam and produce a spot of variable luminous intensity. The photosensitive structure associated with the cathode ray tube acts in response to light emitted from the luminous spot and provides an output video signal, which in differing from the applied video signal indicates distortion introduced in the conversion into light of the applied video signal.

A further object of the present invention is, therefore to utilize the video signal generated from a reproduced image to alter, in effect, the input video signal in a manner, which improves the fidelity of reproduction. As will be more fully described below, this may be accomplished by using the video generated by photosensitive means in a negative feedback circuit associated with the video signal amplifiers.

A still further object of this invention is to provide a cathode ray tube having a screen for image reproduction and photosensitive means symmetrically disposed with respect to the screen.

Another object of this invention is to provide a cathode ray tube with a photosensitive pickup secured to the electron gun thereof.

A further object of this invention is to provide photosensitive electrodes within the envelope of a cathode ray tube.

A still further object of this invention is to provide a video amplifier having negative or inverse feedback, the feedback signal being generated by photosensitive means.

These and other objects of the present invention will now become apparent from the following detailed specification when taken in connection with the accompanying drawings, in which.

Figures 1, 2, 3:
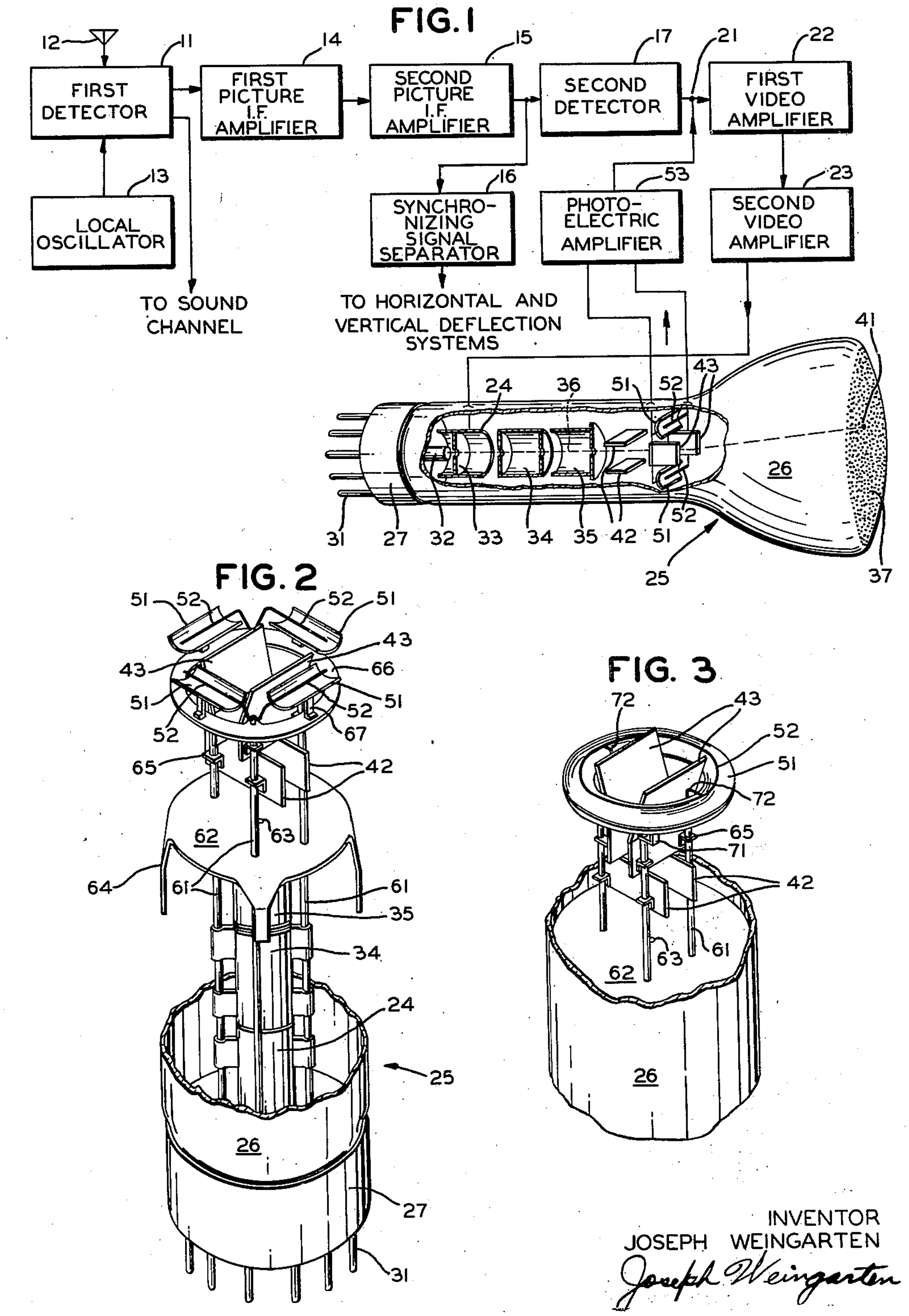
Fig. 1 is a block diagram illustrating the application of this invention to a television receiver.
Fig. 2 is a fragmentary perspective view of a cathode ray tube illustrating the electrode structure thereof.
Fig. 3 is a fragmentary perspective view of another embodiment of a cathode ray tube electrode structure.

Referring now to Fig. 1, there is illustrated, in part, a conventional television receiving system incorporating novel features for substantially reducing distortion of the reproduced image. In this receiver, a first detector 11 is energized by a television signal from an antenna 12 and the signal output of a local oscillator 13. The antenna input generally includes sound and picture information, separated in frequency, and accordingly the output of the first detector 11 comprises a sound intermediate frequency and a picture intermediate frequency. Frequency selective circuits (not shown) in the output of the first detector 11 are employed to separate the two intermediate frequencies, (I. F.'s), the sound I. F. being applied to a sound channel for reproduction, and the picture I. F. being applied to a first picture I. F. amplifier 14. The operation of the sound system is conventional and forms no part of the present invention.

The output of first picture I. F. amplifier 14 is applied to a similar stage, namely second picture I. F. amplifier 15. The extent of I. F. amplification is determined by received signal strength and tube type, and hence amplifiers 14 and 15 are merely illustrative, the actual number of stages being determined by practical considerations. The signal output of I. F. amplifier 15 is divided and applied to a synchronizing signal separator circuit 16, and to a second detector 17. In television systems, synchronizing information for receiver deflection circuits is normally combined with the picture information and selectively separated at the receiver on the basis of amplitude. The synchronizing circuits and the deflection generators associated with the receiver of Fig. 1 may be of various known types and have been omitted from the drawing.

The second detector 17, which may comprise a diode or crystal rectifier, provides an output picture signal, or video, that is a replica of the picture modulation envelope of the signal received at antenna 12. The video signal is applied to input terminal 21 of a first video amplifier 22. The operation of the input circuits of a television receiver has been described above to illustrate a typical video signal source. It is to be understood that a video signal may, however, be obtained directly from a video transmission line or by other suitable means.

First video amplifier 22 is followed by a second video amplifier 23, and the output signal of the latter applied to the control grid 24 of a cathode ray tube 25. A video amplifier comprises, broadly, an amplifier designed to provide substantially uniform amplification over a comparatively broad frequency band, the bandwidth being determined by the nature of the video signal applied. Extensive research, which will not be referred to herein, has resulted in video amplifier design, which may be used to raise the input signal level with negligible distortion of the waveform. Thus, in conventional systems, the signal applied to the cathode ray control grid 24 is a replica of the signal appearing at terminal 21, except for increased intensity.

The number of video amplifier stages required is governed by factors such as required gain, amplifier tube type, and the required phase of the signal at the cathode ray control grid. The two video stages 22 and 23, illustrated in Fig. 1, generally represent the video system of a receiver.

The cathode ray tube 25 is, in part, a conventional structure and comprises an envelope 26 having a flared section extending from a cylindrical section, or neck. A tube base 27 having connecting pins 31 is secured to the neck of the tube. Within the tube, there is illustrated an electron structure for forming and deflecting an electron beam. These electrodes are shown without mechanical support and several without their conventional circuit connections. Although connections to some of the electrodes have been shown for convenience as made through the envelope, it will be understood that these connections may be made through the pins 31 of the base.

The electrode structure comprises a cathode 32 heated by means not shown. The control grid 24 mentioned previously follows the cathode 32, and is a metallic cylinder having a centrally perforated circular plate 33 therein. Electrons emitted from the cathode 32 pass through control grid 24 and are accelerated and collimated by focussing anode 34 and accelerating anode 35. This electrode structure is commonly known as an electron gun, and the axis of the electron beam generated thereby is indicated by broken line 36.

The electron beam impinges upon a target screen 37, usually of a fluorescent material, on the face of the envelope 26. By suitable application of electron gun potentials, a sharply defined luminous spot 41 is produced at the point where the electron beam strikes the fluorescent screen 37. The position of the luminous spot upon the tube face is controlled by the application of suitable potentials to vertical and horizontal deflection plates 42 and 43 respectively. This is known as electrostatic deflection, and in television systems, the deflecting plate potentials are such that the spot 41 rapidly and periodically moves in a rectangular pattern, as determined by synchronizing information applied from synchronizing signal separator 16. Other possible deflection systems omit the deflection plates 42 and 43 and employ magnetic means ordinarily positioned around the cathode ray tube neck.

When the tube 25 is energized by suitable electrode potentials, the luminous intensity of the light spot 41 is instantaneously related to the variation of potential of the control grid 24, coupled as shown to the output of the video amplifier system. As has been pointed out above, however, the relation between signal intensity applied to the cathode ray control grid and light emitted from the spot 41 is non-linear, and varies considerably over the surface of a fluorescent screen and from tube to tube. Ordinarily this precludes high fidelity picture reproduction with a loss in tone range.

As is diagrammatically illustrated in Fig. 1, there is mounted within the envelope 26 of cathode ray tube 25, a photosensitive system, including photosensitive cathodes 51—51 connected in parallel and cooperating photosensitive anodes 52—52, also in parallel. The sensitized surface of each cathode 51 is directed toward the fluorescent screen 37, so as to collect light emitted from luminous spot 41. The photosensitive cathodes and associated anodes are coupled to the input circuit of a photoelectric video amplifier 53, of conventional design. The amplifier 53 serves to provide suitable operating potentials for the electrodes 51 and 52, and to amplify the signal developed thereby as a result of light emitted from spot 41. The mechanism by which the light sensitive system, electrodes 51 and 52, develops an electrical signal fluctuating in response to the intensity of the light directed thereon, is well known and will not be described herein. If a video signal is applied to control grid 24 as described and illustrated, the light variation of spot 41 will in turn cause the photosensitive system to provide a video signal input to the photoelectric amplifier 53. The latter video signal is substantially linearly related to the light intensity variations of luminous spot 41, and represents electrically the instantaneous light variations visible on fluorescent screen 37.

Evidently, if the signal output of the second video amplifier 23 is not, upon comparison, of the same waveform as the video output of photosensitive system 51—52, then the former signal is not reproduced faithfully in the form of light intensity variations, for reasons previously discussed.

In Fig. 1, the amplified output of photoelectric amplifier 53 is coupled back to the input terminal 21 of the video amplifier system. The photoelectric amplifier 53 is itself a video system (which may be frequency compensated) so that the signals generated by the photosensitive electrodes are linearly amplied, with little distortion. The output signal of the photoelectric amplifier is arranged so that the signal applied thereby at terminal 21 is substantially of opposite phase compared with the signal applied at terminal 21 as the output of second detector 17. As is well understood in the art, this negative or inverse feedback arrangement will alter the signal output of video amplifiers 22 and 23 so as to reduce the overall system distortion. It is to be noted that in the system disclosed in Fig. 1, the feedback signal is representative of the final image, and accordingly the feedback means shown minimizes distortion not merely in the amplifiers, but in the complete reproduction system including the reproducing screen 37.

A feedback system as disclosed in Fig. 1, reduces the magnitude of the input signal due to the phase opposition at the input terminal 21, and hence reduces the overall signal gain. This may however be overcome by increasing the number or gain of video amplifiers such as 22 and 23. Clearly, the gain of the photoelectric amplifier may be made variable to control the extent of the feedback, and thus the degree of distortion correction. The correction introduced by the feedback system illustrated is instantaneous in effect and renders reproduction independent of the tube used and imperfections over the surface of the fluorescent screen.

Figure 4:
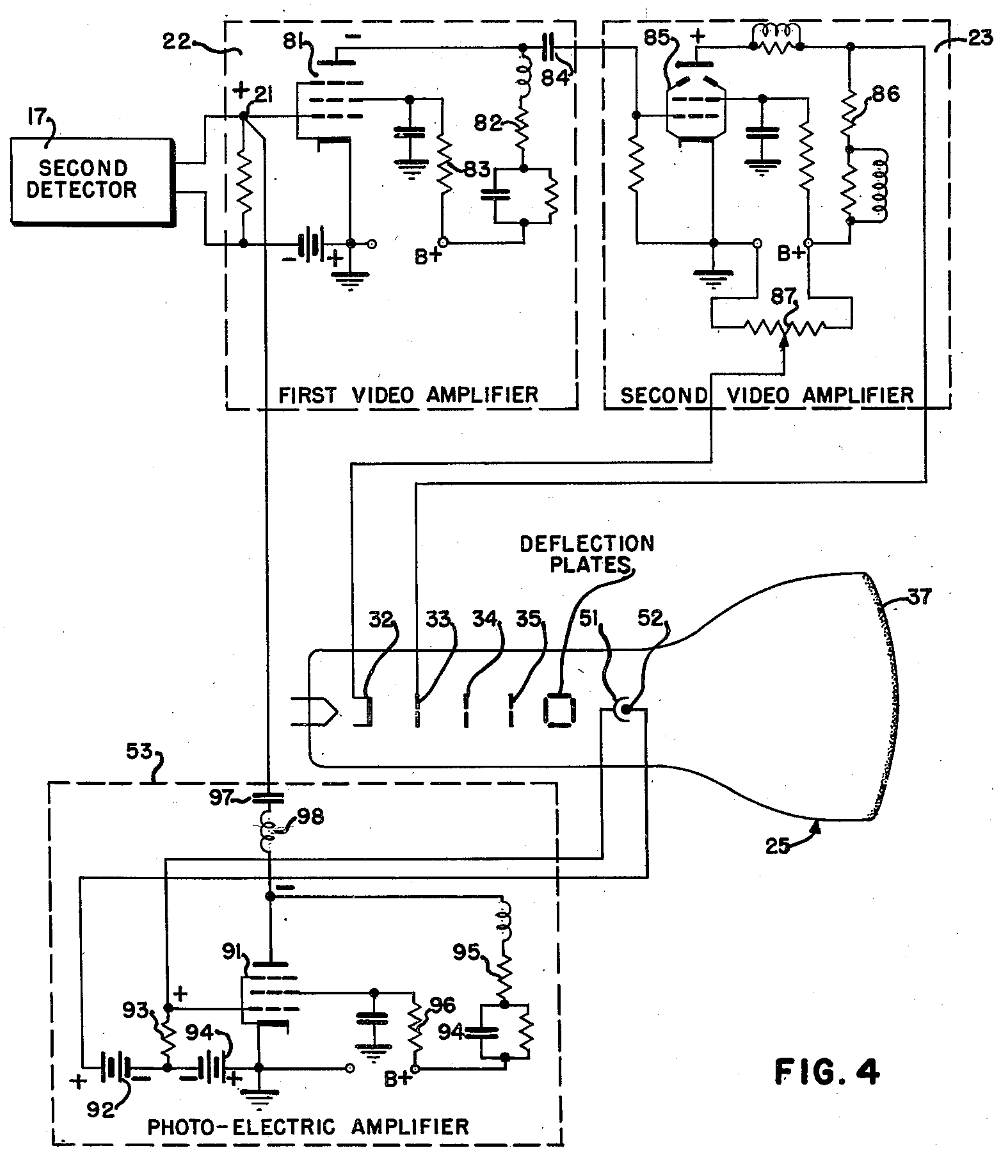
Fig. 4 is a schematic circuit diagram of certain circuit components illustrated in block form in Fig. 1.

Referring now to Fig. 4, there is illustrated schematically certain features of the circuit illustrated in block form in Fig. 1. The components of Fig. 1, carried over into Fig. 4, have been designated by similar reference numerals and comprise, principally, the second detector 17, the first and second video amplifiers 22 and 23, respectively, the cathode-ray tube 25, and its internal electrodes 32, 33, 34, 35, 51 and 52, and the photoelectric amplifier 53.

Considering the features of Fig. 4 in detail, it will be noted that the video signal output of the second detector 17 is applied to the biased control grid of an electron tube 81. The electron tube 81 is connected, as shown, as a conventional video (broad-band) amplifier. Thus, the plate thereof is energized from a suitable power source $B^+$ through a plate load resistor 82 of suitable value. Resistor 82 is in circuit with band-width compensating resistive, capacitive, and inductive elements. The screen of electron tube 81 is also energized from the power source $B^+$ through a current limiting resistor 83.

The signal output of video amplifier electron tube 81 is coupled from the plate thereof through blocking capacitor 84 to the control grid of the second amplifier electron tube 85. A beam power tube is used for the second video amplifier for the purpose of obtaining ample signal output. The plate of electron tube 85 is energized through a load resistor 86 in circuit with suitable phase and band-width compensating elements, and the output signal developed across resistor 86 is applied directly to the control grid 33 of the cathode-ray tube 25. The cathode of the cathode-ray tube 25 is returned to a tap on a potentiometer 87 connected between $B^+$ and ground. Potentiometer 87 thus serves as a brightness control for the system.

As illustrated generally in Fig. 1 and in accordance with the principles of this invention, the photoelectric cathode and anode 51 and 52, respectively, are coupled to the input of a photoelectric amplifier electron tube 91. In detail, the photoelectric cathode and anode are connected in series circuit relationship with a potential source 92 and a load resistor 93, the latter also serving as the grid resistor for electron tube 91. Grid bias is obtained by a potential source 94. It will be evident that fluctuation in photoelectric current, due to variation in light intensity upon photocathode 51, will cause corresponding voltage fluctuations across resistor 93 which will, in turn, be applied to the input of electron tube 91.

As previously mentioned, the photoelectric amplifier 53 is preferably a video amplifier in order to provide the necessary band-with characteristics. Thus, as for video amplifier electron tubes 81 and 85, the plate of electron tube 91 is energized through a load resistor 95 of suitable magnitude in circuit with video compensating inductive and capacitive elements. The screen grid of electron tube 91 is also energized from the positive power source B+ through limiting resistor 96.

The signal output of the photoelectric amplifier electron tube 91 is coupled from the plate thereof through coupling capacitor 97 in series with a compensating inductor 98 to point 21, namely, the control grid of video amplifier electron tube 81. This connection affords the negative feedback correction hereinabove discussed in considerable detail (see Fig. 1).

The video amplifier circuits, including electron tubes 81, 85 and 91, are in all respects conventional and are similar to ordinary radio-frequency amplifiers, modified only by circuit components to provide the necessary band-width and phase-shift characteristics. No attempt will be made here to indicate the basic considerations involved in the design of video amplifiers, but general reference is made to the comprehensive treatment thereof in the text, "Principles of Television Engineering," by Donald G. Fink, McGraw Hill Book Company, New York, 1940. Nor will the general theory of distortion reduction by negative feedback be discussed, since the basic principles of improving signal amplification through the use of negative feedback have been widely published in the radio art. For general reference purposes, however, the advantages of feedback amplifiers are discussed in the text, "Radio Engineering," by Frederick E. Terman, McGraw Hill Book Company, New York, 1937, on pages 248 to 256 thereof.

The operation of the circuit illustrated in Fig. 4 may best be understood by considering a specific example of the relative polarities existing in the circuit at any instant. Thus, if at a particular time the video signal appearing at point 21 is changing in a positive direction, as indicated on Fig. 4, the signal polarity at the plate of electron tube 81 will be negative. This negative change is coupled to the control grid of electron tube 85, producing a positive change in the plate circuit thereof which, as previously mentioned, is coupled directly to the control grid 33 of cathode-ray tube 25. The application of a positively changing signal to control grid 33 will result in the spot 41 (Fig. 1) becoming comparatively brighter. This brightness increase will instantaneously cause an increase in the photoelectric current between photo-cathode 51 and anode 52 and result in a positive voltage change at the control grid of electron tube 91. The latter change will be reflected as a negative change at the plate of electron tube 91 which, through coupling capacitor 97, is applied to point 21. It will thus be apparent that signal changes appearing at the output of second detector 17 will, by virtue of the action of photo-electric elements 51 and 52, be opposed by a signal applied at point 21 through coupling capacitor 97. This opposition is the very essence of inverse or negative feedback and results in a more uniform relation between the instantaneous luminous intensity of the reproduced spot on fluorescent screen 37 and the instantaneous value of the video signal applied from the output of second detector 17. In this manner, the tonal range of the reproduced image is more nearly in correspondence with the potential variation of the video signal, thereby substantially overcoming distortion ordinarily introduced as a result of the non-linear characteristics of fluorescent screens.

There are, of course, many other correction systems which may be used with a signal of the type generated by the photo-sensitive system shown to improve the overall reproduction. Thus, the video signal output of the second detector 17 or the second video amplifier 23 may be compared directly with the output of photoelectric amplifier 53 in a differential amplifier, and the output signal used to compensate the video amplifier circuits 22 and 23. The effect however is the same as that of the feedback loop shown in Fig. 1.

The photosensitive system incorporated in the cathode ray tube 25 is structurally simple, since the electrodes 51 and 52 need not be enclosed in a separate envelope. Evacuation of the cathode ray tube envelope 26 places all electrodes including photo electrodes 51 and 52 in vacuum.

The electrode system illustrated in Fig. 1 merely indicates the principles of a cathode ray tube structure which includes photoelectric elements. Practical electrode structures are illustrated in broken views, Figs. 2 and 3, and reference is made thereto. For simplicity, elements in these figures which correspond to elements shown in Fig. 1, have been similarly designated.

In Fig. 2, the control grid 24, focussing electrode 34 and accelerating anode 35 of a conventional cathode ray tube are assembled upon four insulating rods 61 within the envelop 26 and upon tube base 27. The leads which connect these electrodes to the tube prongs 31 have not been shown. Secured to anode 35 is a circular conductive plate 62 perforated at 63 for the passage of the electron beam. A plurality of tabs 64 extending from plate 62 serve to support the electron gun shown within the envelope 26 and to contact the conductive paint (not shown) normally coated over the inner surface of the envelope. The deflecting electrodes 42 and 43 are secured to the insulating rods 61 by tabs such as 65.

Symmetrically disposed at the upper end of the electrode structures and secured to rods 61 is a conductive ring 66. Four semi-cylindrical photosensitive cathodes 51 are symmetrically positioned about ring 66 and connected thereto by conductive supports 67. The ring 66 is connected to one of pins 31, as for example by a lead (not shown) extending through one of rods 61. Cooperating with cathode 51 are four wire anodes 52 connected in pairs through two of rods 61 to tube pins.

The cathodes 51 are adapted to receive light from the luminous spot 41 on the tube fluorescent screen 37, Fig. 1. The number of photoelectric cathodes 51 used is not critical. The size of these electrodes and the sensitivity thereof are governed by the design of the tube in which these electrodes are used. It is preferable that the photoelectrodes be shielded from the effects of the light emitted from the tube filament and cathode.

In Fig. 3, the photoelectric structure has been simplified, and made symmetrical with respect to the electron gun structure and deflection system. As shown, the photoelectric cathode 51 comprises an annular member of arcuate cross-section, secured to the rods 61 by a plurality of supports 71. The photo cathode 51 may be connected to a tube base pin by a lead through an insulating rod 61. Symmetrically positioned with respect to cathode 51 is a wire ring anode 52, for collecting electrons emitted by cathode 51. The ring 52 is supported by a pair of connecting leads 72, one or both of which may connect through rods 61 to tube base pins.

It is evident that the particular shapes of the photo-electrodes 51, 52 and the manner of support on the electron gun structure are dependent upon the tube type. Thus, for a tube using magnetic beam deflection, the photo-electrodes may be mounted adjacent the accelerating anode. In some applications, the photo electrodes 51, and 52 may be separated from the gun and supported by leads extending directly through seals in the envelope as is illustrated in Fig. 1.

Ordinarily, the photo-electrodes 51, and 52 have negligible effect upon the normal generation and deflection of the luminous spot 41 due to proximity of the deflecting electrodes. However, the entire photoelectric system may be electrostatically shielded by enclosing these electrodes in a wire mesh or similar conductive screen (not shown). This screen precludes intercoupling of the electrodes, while permitting the photo cathode 51 to receive light emitted from the luminous spot 41. In addition, the electrode potentials of the cathode ray tube 25 may be arranged so that the photo electrodes 51, 52 are at substantially accelerating anode potential, while the required small operating potential difference is maintained between cathode and anode 51 and 52, respectively. Similarly deflection plates 42 and 43 may be maintained at an average potential equal to the accelerating anode potential. It is thus preferable that the accelerating anode 35 be operated at ground potential. The cathode ray tube type illustrated in the figures are of conventional design, having axial symmetry. There are cathode ray tubes, particularly for image projection, which employ asymmetrical envelopes, such that the fluorescent screen is at an angle with respect to the electron gun axis. For such tubes, it is preferable to arrange photo electrodes for image correction symmetrically with respect to the fluorescent screen, so that the light received by the photo-cathode is substantially independent of the light spot position.

It is to be understood that the novel cathode ray tube incorporating photo sensitive elements, as illustrated in the figure, has application to numerous image systems, other than the specialized television receiver application described in connection with Fig. 1. Thus, the video signal generated by the photo electrodes may be filtered, and used to control the receiver gain, thereby providing automatic brightness control. Also, a video system of the type shown in Fig. 1, may be used at a television transmitter to compensate the video to be transmitted for the distortion introduced by a cathode ray reproducing screen. Such compensation, however, would not be for the individual receiving tube, but rather for the average of one cathode ray tube.

In some applications of the principles of improvement of picture fidelity as disclosed in Fig. 1, it may be desirable to use a photo sensitive system which is not included within the cathode ray tube envelope. Accordingly suitable light sensitive apparatus may be disposed in front of the tube screen, or at any other point where light from the image can be collected, so as to generate a video signal from the variable intensity image spot. The nature of the photo sensitive material is not critical for application in the present invention.

Thus, since many modifications and extensions of the principles hereinabove described and illustrated may now become apparent to those skilled in the art, it is preferred that the spirit and scope of the present invention be limited only by the appended claims.

The invention described herein may be manufactured and used by or for the Government of the United States of America for government purposes without the payment of royalty thereon or therefor.

What is claimed is:

1. A cathode ray tube comprising, within an envelope, an electron gun for producing an electron beam, a fluorescent screen for producing a luminous spot when acted upon by said electron beam, and photoelectric means secured to said electron gun without the path of said electron beam adapted to receive light from said luminous spot, whereby said photoelectric means provides an electrical signal substantially proportional to the instaneous luminous intensity of said spot.

2. A cathode ray tube comprising, an electron gun for producing an electron beam, a fluorescent screen for producing a luminous spot when acted upon by said electron beam, and a plurality of photosensitive elements symmetrically disposed with respect to said fluorescent screen and adapted to receive light from said luminous spot, said plurality of photosensitive elements being interconnected, whereby said elements provide an electrical signal related to the instantaneous luminous intensity of said spot.

3. A cathode ray tube comprising, an electron gun for producing an electron beam, a fluorescent screen for producing a luminous spot when acted upon by said electron beam, and a substantially annular photoelectric cathode symmetrically disposed with respect to said electron gun and said fluorescent screen and adapted to receive light from said luminous spot, and a substantially circular photoelectric anode disposed in operative relation to said photoelectric cathode, whereby said photoelectric cathode and anode provide an electrical signal output as determined by the instantaneous luminous intensity of said spot.

4. A cathode ray tube comprising, within an envelope, the combination of an electron gun having a cathode and electron accelerating electrodes, a fluorescent screen, and a photosensitive element affixed to said electron gun and disposed to receive light principally from said fluorescent screen and circuit means for deriving from said photosensitive element an electrical signal instantaneously proportional to the luminous intensity of said fluorescent screen.

5. An electron tube electrode structure comprising axial electron beam generating means and a distinct photosensitive electrode system affixed thereto for providing an electrical signal proportional to the intensity of light falling thereon, said photosensitive electrode system being formed substantially symmetrically about the axis of said beam generating means and arranged to permit the passage therethrough of a generated electron beam.

6. A cathode ray tube comprising, an electron gun for producing an electron beam, said gun having a cathode, accelerating electrodes and electron beam deflection electrodes, a fluorescent screen for producing light when energized by said electron beam, and photosensitive electrodes secured to said electron gun adjacent said deflection electrodes and arranged to receive light principally from said fluorescent screen and to provide an electrical output signal proportional to the light so received.

7. A cathode ray tube comprising, within an envelope, an electron gun for producing an electron beam, a fluorescent screen for producing a luminous spot when acted upon by said electron beam and means adapted to receive light from said luminous spot and generate an electrical signal instantaneously proportional to the luminous intensity of said spot, said means comprising photoelectric electrodes secured to said electron gun and spaced from the path of said electron beam.

8. A television receiver comprising in combination, means for receiving television signals from a remote television transmitter, detector means responsive to said signals for providing a first video signal for reproduction by said receiver, a picture reproducing cathode ray tube having means for forming an electron beam, a fluorescent screen responsive to said electron beam for providing a luminous spot and means for modulating the intensity of said electron beam, means for applying said first video signal to said modulating means for forming a picture on said fluorescent screen, photoelectric means adapted to receive light from said fluorescent screen and thereby generate a second video signal varying substantially as said first video signal as a function of time, and inverse feedback means for continuously combining said first video signal and said similarly varying second video signal in opposite electrical phase, said inverse feedback means being thereby continuously operative to adjust the signal applied to said modulating means, whereby the variation of light intensity of said luminous spot is substantially linearly related to said first video signal.

9. A television receiver comprising in combination, means for receiving television signals from a remote television transmitter, detector means responsive to said signals for providing a first video signal for reproduction by said receiver, a picture reproducing cathode ray tube having means for forming an electron beam, a fluorescent screen responsive to said electron beam for providing a luminous spot and means for modulating the intensity of said electron beam, means for sweeping said electron beam over said screen, a first amplifier system for said first video signal, means for applying the output of said first amplifier system to said modulating means for forming a picture on said cathode ray tube fluorescent screen, photoelectric means adapted to receive light from said fluorescent screen and thereby generate a second video signal varying substantially as said first video signal as a function of time, a second amplifier system energized by said second video signal, and inverse feedback means for applying the output of said second amplifier system to the input of said first amplifier system in opposite electrical phase, whereby the output of said first amplifier system as applied to said modulating means is continuously adjusted in magnitude opposite to the variation of light intensity of said luminous spot.

10. An image system comprising in combination, means for applying a first video signal for reproduction, a cathode ray tube having means for forming an electron beam, a fluorescent screen responsive to said electron beam for providing a luminous spot and means for modulating the intensity of said electron beam, means for sweeping said electron beam over said screen, means for applying said first video signal to said modulating means for forming an image on said fluorescent screen, photoelectric means adapted to receive light from said fluorescent screen and thereby generate a second video signal varying substantially as said first video signal as a function of time, and inverse feedback means for continuously combining said first video signal and said similarly varying second video signal in opposite electrical phase, said inverse feedback means being thereby continuously operative to adjust the signal applied to said modulating means, whereby the variation of light intensity of said luminous spot is substantially linearly related to said first video signal.

JOSEPH WEINGARTEN.

REFERENCES CITED

The following references are of record in the file of this patent:

UNITED STATES PATENTS

| Number | Name | Date |
|---|---|---|
| 2,011,947 | Nicolson | Aug. 20, 1935 |
| 2,062,538 | Van Den Bosch | Dec. 1, 1936 |
| 2,134,851 | Blumlein | Nov. 1, 1938 |
| 2,156,813 | Kautz | May 2, 1939 |
| 2,163,233 | Brown | June 20, 1939 |
| 2,169,714 | Urtel | Aug. 15, 1939 |
| 2,181,720 | Barthelemy | Nov. 28, 1939 |
| 2,188,679 | Dovaston et al. | Jan. 30, 1940 |
| 2,200,749 | Kemp | May 14, 1940 |
| 2,214,072 | Biedermann | Sept. 10, 1940 |
| 2,220,181 | Steudel et al. | Nov. 5, 1940 |
| 2,246,283 | Zworykin | June 17, 1941 |
| 2,330,930 | Snyder, Jr. | Oct. 5, 1943 |
| 2,415,059 | Zworykin | Jan. 28, 1947 |

FOREIGN PATENTS

| Number | Country | Date |
|---|---|---|
| 868,847 | France | Jan. 17, 1942 |
| 821,352 | France | Aug. 23, 1937 |
| 517,483 | Great Britain | Jan. 31, 1940 |